United States Patent [19]

Schroeder

[11] 4,261,491
[45] Apr. 14, 1981

[54] CONVERTIBLE HAND-TO-BICYCLE BAG

[76] Inventor: Fred Schroeder, 1310 Wertland St., Charlottesville, Va. 22903

[21] Appl. No.: 18,432

[22] Filed: Mar. 7, 1979

[51] Int. Cl.³ .............................. B62J 7/02; B62J 9/00; A45C 13/26
[52] U.S. Cl. ......................................... 224/31; 150/12; 190/58 C; 294/141
[58] Field of Search ...................... 224/31, 32 A, 32 R, 224/36, 39, 41, 30 R, 30 A, 46 R, 47, 45 P; 16/115; 150/33, 12; 190/18 R, 18 A, 57, 58 B, 58 C, 60

[56] References Cited

U.S. PATENT DOCUMENTS

| 2,552,443 | 5/1951 | Molinari | 224/30 R X |
|---|---|---|---|
| 2,662,619 | 12/1953 | Zweigbaum | 190/18 R X |
| 2,707,035 | 4/1955 | Lashley | 150/33 X |
| 3,019,952 | 2/1962 | Brewster | 224/46 R |
| 4,066,196 | 1/1978 | Jackson et al. | 224/31 X |
| 4,116,253 | 9/1978 | Watsky | 224/45 P X |
| 4,154,382 | 5/1979 | Blackburn | 224/39 |

FOREIGN PATENT DOCUMENTS

| 943133 | 2/1949 | France | 224/32 A |
|---|---|---|---|
| 237293 | 4/1945 | Switzerland | 224/151 |
| 448779 | 4/1968 | Switzerland | 224/31 |
| 437567 | 10/1935 | United Kingdom | 150/33 |

*Primary Examiner*—Robert J. Spar
*Assistant Examiner*—Jerold M. Forsberg

[57] ABSTRACT

A convertible hand-to-bicycle bag has handles which comprise an elastic intermediate portion for engaging fastening means on a bicycle when stretched and end portions connected to a body such that the handles may be disposed in a first, hand-carrying position wherein the handles straddle the body with the intermediate portions disposed adjacent each other above the body, and in a second, bicycle attaching position wherein the handles straddle a bicycle on which the bag is mounted.

1 Claim, 3 Drawing Figures

CONVERTIBLE HAND-TO-BICYCLE BAG

FIELD OF THE INVENTION

The present invention relates in general to carrier bags which are convertible from being hand carried to vehicular mounted, and in particular, to convertible hand-to-bicycle carrier bags.

BACKGROUND OF THE INVENTION

The advantages of the bicycle as an economical, healthful, ecological and enjoyable means of transportation and recreation are being recognized by increasing numbers of people. However, one problem which has deterred more widespread use of the bicycle has been the lack of a general purpose carrying bag which is suited both for use as a hand bag and as an easily attached and detached bike bag. On the one hand, most conventional hand bags are not designed to be readily mounted on a bicycle, and mounting thereof generally requires that such a bag be strapped onto the bicycle with separate mounting straps which are inconvenient and time-consuming to use. On the other hand, most conventional bike bags are specially designed only for use on bicycles, which design renders such bags akward to use as hand bags. Further, in order to be securely mounted on a bicycle, the typical conventional bike bag is provided with relatively elaborate mounting apparatus which does not allow simple or quick attachment and detachment of the bag.

Convertible hand-to-bicycle bags are not unknown in the prior art. Two examples of which applicant is aware are disclosed in U.S. Pat. Nos. 3,786,972 (Alley); and 3,955,728 (Jackson et al.). The Alley patent discloses a combination carrier which is convertible from a rack-mounted bicycle pannier bag to a valise and to a back pack. The Jackson et al. patent discloses a bicycle handlebar which employs "Velcro" fasteners that can be adapted to form a bag strap for use of the bag as a shoulder bag. However, such prior art convertible bags suffer from a number of disadvantages, a principal one of which is that separate, specialized mounting members and handles are provided, respectively, for attachment of the bags to bicycles and for handcarrying of the bags. As a consequence, such convertible bags are relatively expensive to manufacture, and relatively complicated and inconvenient to convert from bicycle to hand use.

SUMMARY OF THE INVENTION

These and other disadvantages of the prior art are overcome by a convertible bag constructed in accordance with the present invention, which comprises a body for containing articles and at least one handle having an elastic intermediate portion for engaging fastening means on a bicycle when stretched connected at the ends thereof to the body such that the handle may be selectively disposed in a first hand-carrying position and in a second bicycle attaching position. Preferably the bag is provided with two handles wich are connected to the base of the body such that the handles straddle a bicycle on which the bag is mounted when the handles are in the second position and such that the handles straddle the body with the intermediate portions disposed adjacent each other above the body when the handles are disposed in the first position thereof. The handles preferably further comprise strap-like end portions connected to the body base at spaced locations such that the end portions are inclined with respect to each other and the intermediate portion defines an arc which subtends a chord having a distance less than the distance between the locations at which the handles are attached to the body base.

Other features and advantages of the invention will be set forth in, or apparent from, the detailed description of a preferred embodiment found hereinbelow.

DETAILED DESCRIPTION OF A PREFERRED EMBODIMENT

Figure 1:
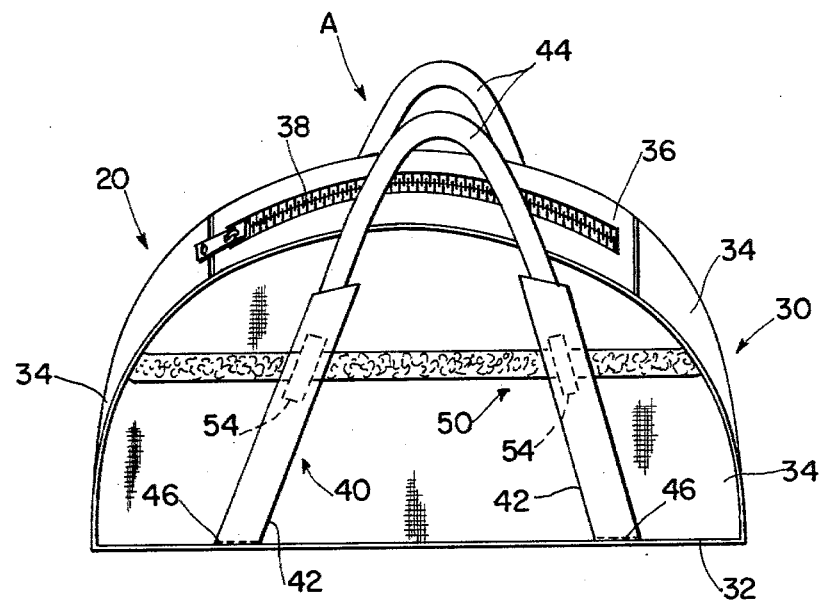
FIG. 1 is a perspective view showing a convertible carrier bag constructed in accordance with the present invention.
Figure 3:
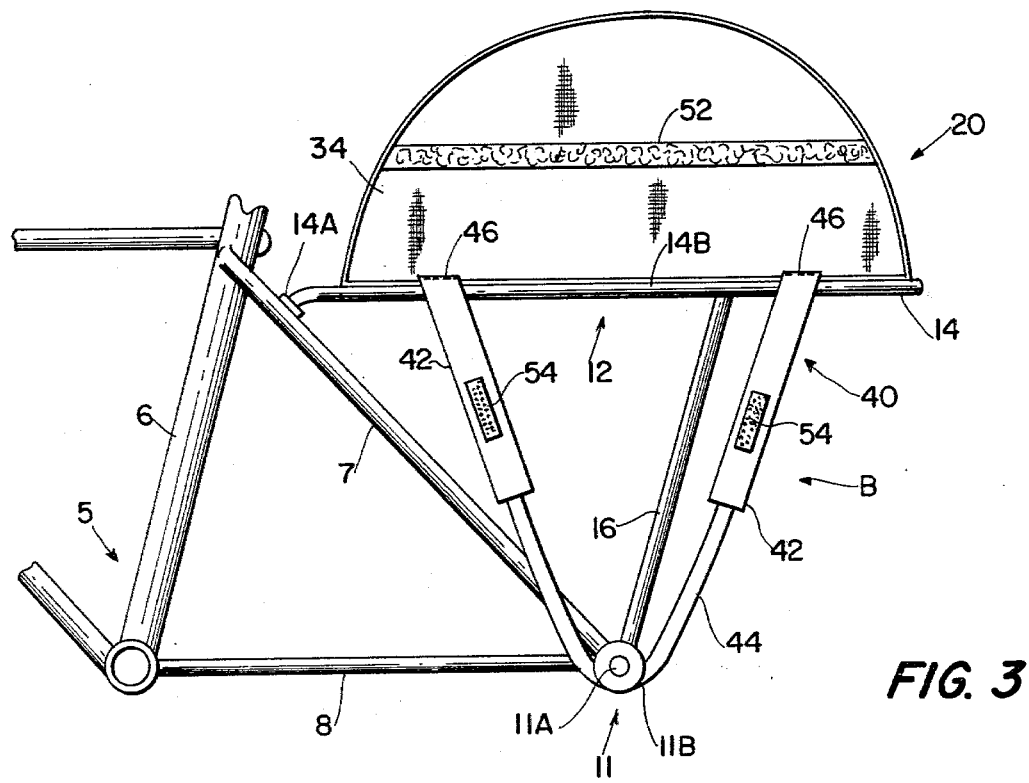
FIG. 3 is a side elevation view showing the bag illustrated in FIG. 1 mounted on the rack equipped bicycle frame illustrated in FIG. 2.

A convertible bag constructed in accordance with the present invention is illustrated in FIGS. 1 and 3. The bag, which is generally denoted 20, generally comprises a body 30 for containing articles (not shown), and a pair of handles 40 for hand-carrying of the bag and for attaching the bag to a bicycle in the manner to be described in more detail hereinbelow.

Figure 2:
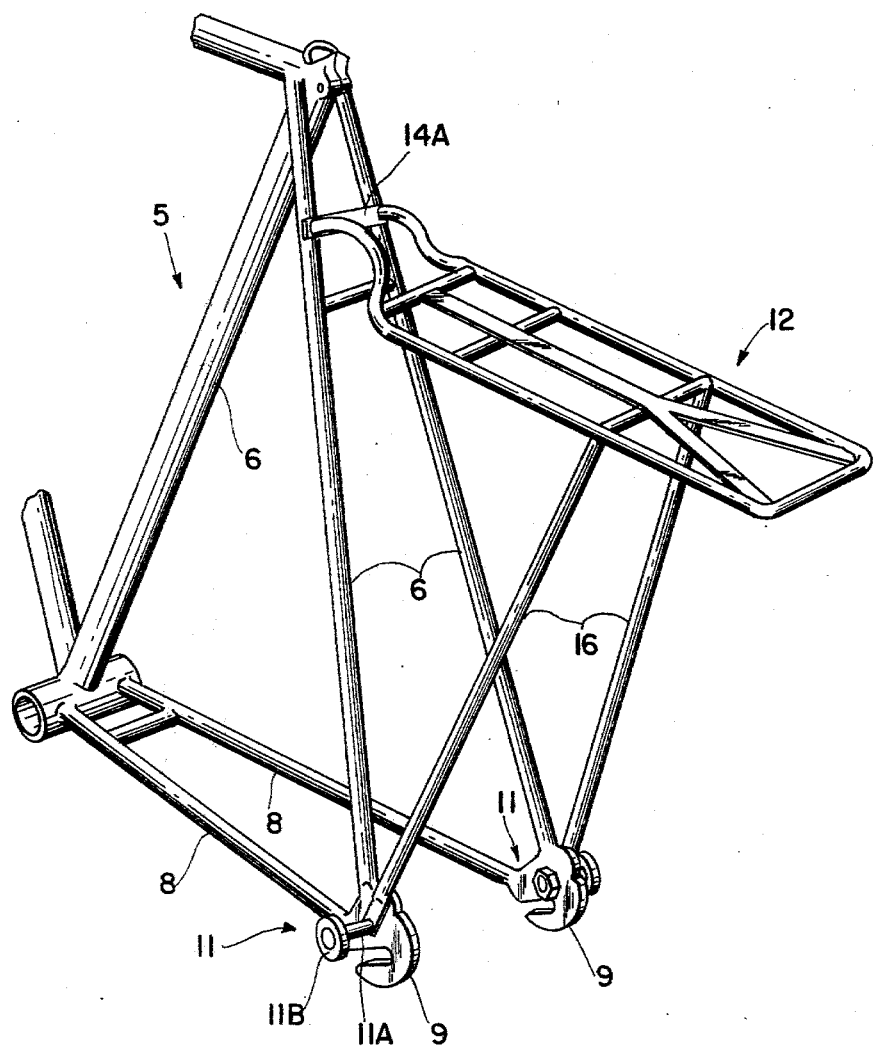
FIG. 2 is a perspective view of a portion of a conventional bicycle frame equipped with a conventional rear-mounted rack on which the bag illustrated in FIG. 1 is adapted to be mounted.

Body 30 may have any desired configuration. Preferably, body 30 has a base 32 which can be mounted on a support surface defined by the bicycle or by equipment mounted thereon. The embodiment of bag 20 illustrated in the drawings has a flat base 32, which is particularly suited for use with a conventional rear-mounted bicycle rack 12, as shown in FIG. 2. Advantageously, base 32 of the illustrated bag embodiment is reinforced with a rigid insert (not shown), or the like.

Body 30 preferably further comprises a plurality of upstanding walls, which are generally denoted 34, and a top wall 36 which is provided with a zippered, or other closeable opening 38 for access to the interior of body 30.

Each handle comprises end portions 42 connected together by an elastic intermediate portion 44. The distal ends 46 of end portions 42 are connected to body 30 such that each handle 40 may be disposed in a first, hand-carrying position, generally denoted by the arrow A as shown in FIG. 1, and in a second, bicycle attaching position, generally denoted by the arrow B as shown in FIG. 3.

Preferably, end portions 42 are flexible, strap-like members which are connected to base 32 at spaced locations along the periphery thereof, as shown, such that handles 40 straddle a bicycle when bag 20 is mounted thereon and the handles are disposed in position B, and such that handles 40 straddle body 30 when the handles are disposed in position A. End portions 42 preferably are dimensioned, as shown, such that intermediate portions 44 are disposed adjacent each other above body 20 when handles 40 are disposed in position A. The end portions 42 of each handle 40 are further connected to base 32 as shown such that they are inclined with respect to each other and the corresponding intermediate portion 44 defines an arc which subtends a chord having a length less than the distance between the locations at which end portions 42 are connected to base 32.

Intermediate portion 44 of handle 40 advantageously is made of an elastomeric material, and preferably from shock cord or the like having a relatively high resilience to stretching such that when intermediate portion 44 is stretched into engagement with a fastening member on a bicycle, as will be described in more detail hereinbelow, body 30 is held securely in place on the support surface provided therefor; and such that the maximum amount of weight intended to be carried within body 30 may be supported by intermediate portions 44 without excessive extension thereof.

Bag 20 further comprises fasteners, generally denoted 50, having the mating components 52 and 54 thereof mounted, respectively, on walls 34 of body 30, and on end portions 42 of handles 40 such that handles 40 may be releasably secured in position A. Advantageously, fasteners 50 may comprise complementary "Velcro" strips, i.e., one strip made with a surface of tiny hooks and one strip made of an adhesive pile that can be pressed together and pulled apart for easy fastening and unfastening.

Depending on the configuration of body 30, bag 20 is mounted on a bicycle simply by placing body 30 on any suitable support surface provided by the bicycle, disposing handles 40 in bicycle attaching position B, and stretching intermediate portions 44 of handles 40 into engagement with any suitable fastening means provided by the bicycle. As noted above, the illustrated embodiment of bag 20 is particularly adapted for mounting on a conventional rear-mounted rack 12, as shown in FIGS. 2 and 3. As is well known in the art, such a rack 12 comprises a support frame 14 having a mounting end 14A and defining a support surface 14B, and a pair of mounting legs 16 depending from frame 14. Rack 12 is mounted on a conventional bicycle frame, which is generally denoted 5, and which comprises a seat tube 6, seat stays 7, chain stays 8, and fork ends 9, by mounting support frame end 14A to seat stays 7 by means of a conventional mounting bracket (not shown), and by mounting the distal end of each leg 16 to the corresponding fork end 9 by means of a conventional nut and bolt fastener, generally denoted 11.

Bag 20 is mounted on rack 12 as shown by placing base 32 of bag body 30 on support surface 14B of rack 12 such that handles 40 can straddle bicycle frame 5, disposing handles 40 in position B, and stretching intermediate portions 44 of handles 40 into engagement with suitable fastener means associated with fork ends 9. As will be appreciated by those of ordinary skill in the art, any protruding member, such as the rear wheel axle (not shown) of the bicycle may advantageously constitute suitable fastener means for intermediate portions 44. Preferably, rack-mounting fastener 11 is configured to constitute such a fastening means by further comprising a spacer element 11A and washer 11B mounted as shown such that elements 11A protrude outwardly from fork ends 9 and washers 11B define flanges at the distal ends of elements 11A. As will be appreciated by those of ordinary skill in the art, washers 11B prevent intermediate portions 44 which are engaged around elements 11A from accidentally slipping off fasteners 11.

As should be apparent from the foregoing description, a convertible bag constructed in accordance with the foregoing invention is readily converted, and utilizes the same handles for both hand-carrying and attachment to a bicycle. In addition, the manner in which such a bag is attached to a bicycle allows simple and quick attachment and detachment, yet securely holds the bag in place when attached with a minimum of connections. It is to be particularly noted that the preferred bag construction of the present invention produces opposing tension forces when the handles are in fastening engagement with a bicycle which prevent both lateral and longitudinal displacement of the bag body on the bicycle mounting surface.

Although the invention has been described with respect to an exemplary embodiment thereof, it will be understood that variations and modifications can be effected in the embodiment without departing from the scope or spirit of the invention.

I claim:

1. A convertible hand-to-bicycle carrier bag adapted for use on a bicycle equipped with fastening means and means defining a support surface, said convertible bag comprising:

a body for containing articles, said body comprising a base which engages the support surface when said body is mounted thereon, and upstanding walls;

first and second handles, each of said handles comprising first and second flexible, strap-like end portions, and an elastic intermediate portion, for engaging the fastening means when stretched so as to securely hold said body in place on the support surface, joining said end portions; said handles being connected to said base such that said handles may be selectively disposed in a first, hand-carrying, position wherein said handles straddle said body with said intermediate portions disposed adjacent each other at least partially above said body, and in a second, bicycle attaching, position wherein said handles straddle the bicycle when said body is mounted on the support surface; and the distal ends of said end portions of each of said handles being connected to said base at spaced locations and such that for each of said handles the end portions thereof are inclined with respect to each other and said intermediate portion thereof defines an arc which subtends a chord having a length less than the distance between said spaced locations; and fastening means mounted on said handle end portions and cooperating fastening means mounted on said body upstanding walls such that said handles may be releasably secured in said first position.

* * * * *